United States Patent
Bhattad et al.

(10) Patent No.: US 9,363,001 B2
(45) Date of Patent: Jun. 7, 2016

(54) METHOD AND APPARATUS OF USING CDD LIKE SCHEMES WITH UE-RS BASED OPEN LOOP BEAMFORMING

(71) Applicant: QUALCOMM Incorporated, San Diego, CA (US)

(72) Inventors: Kapil Bhattad, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/565,124

(22) Filed: Dec. 9, 2014

(65) Prior Publication Data

US 2015/0085948 A1    Mar. 26, 2015

Related U.S. Application Data

(63) Continuation of application No. 13/253,747, filed on Oct. 5, 2011, now Pat. No. 8,934,560.

(60) Provisional application No. 61/391,016, filed on Oct. 7, 2010, provisional application No. 61/482,164, filed on May 3, 2011.

(51) Int. Cl.
*H04B 7/02* (2006.01)
*H04B 7/04* (2006.01)
(Continued)

(52) U.S. Cl.
CPC ............ *H04B 7/0486* (2013.01); *H04B 7/0478* (2013.01); *H04B 7/0617* (2013.01);
(Continued)

(58) Field of Classification Search
CPC .................................................... H04B 7/0456
USPC ......................................................... 375/267
See application file for complete search history.

(56) References Cited

U.S. PATENT DOCUMENTS 7,881,395 B2 * 2/2011 Lee et al. ...................... 375/267
7,995,671 B2    8/2011 Kim et al.
(Continued)

FOREIGN PATENT DOCUMENTS

JP          2010532130 A     9/2010
KR       20080072465 A     8/2008
(Continued)

OTHER PUBLICATIONS

International Search Report and Written Opinion—PCT/US2011/055032—ISA/EPO—Jan. 27, 2012.
(Continued)

*Primary Examiner* — Santiago Garcia
(74) *Attorney, Agent, or Firm* — Norton Rose Fulbright US LLP

(57) ABSTRACT

A method and apparatus of wireless communication are disclosed. The wireless communication performs pilot signal transmissions using a first precoding matrix for user equipment specific pilot signals, the pilot signal transmissions having a first transmission rank. The wireless communication also performs data transmissions using a second precoding matrix for data when the data transmissions have a second transmission rank less than the first transmission rank, in which the second precoding matrix includes a transformed version of the first precoding matrix. Alternatively, the wireless communication can perform data transmissions using at least two precoding matrices for data when the data transmissions have a second transmission rank less than or equal to the first transmission rank. Accordingly, the precoding matrix used for data is a transformed version of the precoding matrix used for user equipment specific pilot signals.

28 Claims, 10 Drawing Sheets

(51) Int. Cl.
  *H04B 7/06* (2006.01)
  *H04L 25/03* (2006.01)
  *H04L 5/00* (2006.01)
(52) U.S. Cl.
  CPC ........ *H04B7/0671* (2013.01); *H04L 25/03343* (2013.01); *H04L 5/0023* (2013.01); *H04L 2025/03426* (2013.01)

(56) References Cited

U.S. PATENT DOCUMENTS

| | | | |
|---|---|---|---|
| 8,611,447 B1* | 12/2013 | Gomadam et al. | 375/267 |
| 8,767,843 B2* | 7/2014 | Sayana et al. | 375/260 |
| 8,780,771 B2 | 7/2014 | Kim et al. | |
| 8,934,560 B2 | 1/2015 | Bhattad et al. | |
| 2008/0205533 A1* | 8/2008 | Lee et al. | 375/260 |
| 2008/0232494 A1* | 9/2008 | Pan et al. | 375/260 |
| 2008/0260058 A1* | 10/2008 | Li | 375/260 |
| 2009/0006518 A1* | 1/2009 | Rensburg et al. | 708/520 |
| 2009/0197546 A1 | 8/2009 | Kim et al. | |
| 2009/0219838 A1* | 9/2009 | Jia et al. | 370/278 |
| 2009/0262694 A1* | 10/2009 | Lee et al. | 370/329 |
| 2010/0061477 A1* | 3/2010 | Lee et al. | 375/267 |
| 2010/0075706 A1 | 3/2010 | Montojo et al. | |
| 2010/0150266 A1* | 6/2010 | Mondal et al. | 375/296 |
| 2010/0177844 A1* | 7/2010 | Ko et al. | 375/295 |
| 2010/0232384 A1 | 9/2010 | Farajidana et al. | |
| 2010/0254295 A1* | 10/2010 | Ahn et al. | 370/312 |
| 2010/0284484 A1 | 11/2010 | Joengren et al. | |
| 2010/0309861 A1 | 12/2010 | Gorokhov et al. | |
| 2011/0028141 A1* | 2/2011 | Yang et al. | 455/422.1 |
| 2011/0032839 A1 | 2/2011 | Chen et al. | |
| 2011/0134859 A1* | 6/2011 | Li et al. | 370/329 |
| 2011/0255580 A1* | 10/2011 | Khan | 375/219 |
| 2011/0261894 A1* | 10/2011 | Yu et al. | 375/267 |
| 2011/0261897 A1* | 10/2011 | Jen et al. | 375/285 |
| 2012/0020434 A1* | 1/2012 | Callard et al. | 375/296 |
| 2012/0033715 A1 | 2/2012 | Nammi et al. | |
| 2012/0062421 A1* | 3/2012 | Su et al. | 342/373 |
| 2012/0121034 A1* | 5/2012 | Murakami et al. | 375/295 |
| 2012/0170540 A1* | 7/2012 | Khan | 370/329 |
| 2012/0236909 A1* | 9/2012 | Ma et al. | 375/146 |
| 2012/0263248 A1* | 10/2012 | Liu et al. | 375/260 |
| 2013/0012119 A1* | 1/2013 | Ma et al. | 455/9 |
| 2013/0094613 A1* | 4/2013 | Khan | 375/316 |
| 2013/0121432 A1* | 5/2013 | Mondal et al. | 375/267 |

FOREIGN PATENT DOCUMENTS

| | | |
|---|---|---|
| WO | 2008098092 | 8/2008 |
| WO | WO-2008098093 | 8/2008 |
| WO | WO-2008098225 A2 | 8/2008 |
| WO | WO-2010064827 A2 | 6/2010 |
| WO | WO-2010090442 A2 | 8/2010 |
| WO | WO-2010105229 A1 | 9/2010 |

OTHER PUBLICATIONS

QUALCOMM Europe, "Downlink MIMO transmission modes", 3GPP Draft, R1-094872 DL MIMO Transmission Modes, 3rd Generation Partnership Project (3GPP), Mobile Competence Centre, 650, Route Des Lucioles, F-06921 Sophia-Antipolis Cedex, France, no. Jeju, Nov. 9, 2009, XP050389250, [retrieved on Nov. 3, 2009], p. 1.

QUALCOMM Europe, "Downlink transmission modes in LTE-A," 3GPP TSG-RAN WG1 #58bis, Oct. 6, 2009, R1-094216.

* cited by examiner

METHOD AND APPARATUS OF USING CDD LIKE SCHEMES WITH UE-RS BASED OPEN LOOP BEAMFORMING

CROSS-REFERENCE TO RELATED APPLICATIONS

This present application is a continuation of co-pending, commonly assigned, U.S. patent application Ser. No. 13/253,747, filed Oct. 5, 2011, which claims the benefit pursuant to 35 U.S.C. §119(e) of U.S. Provisional Application No. 61/391,016, filed Oct. 7, 2010; and U.S. Provisional Application No. 61/482,164, filed May 3, 2011; which applications are specifically incorporated herein, in their entirety, by reference.

BACKGROUND

I. Field

The present disclosure relates generally to wireless communication, and more specifically to techniques for allocating and using transmission resources in a multi-input multi-output (MIMO) wireless communication system.

II. Background

Wireless communication systems are widely deployed to provide various communication content such as voice, video, packet data, messaging, broadcast. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A base station may include multiple transmit and/or receive antennas. Each UE may include multiple transmit and/or receive antennas. In certain designs, such as the Release-8 and Release-9 versions of the Long Term Evolution (LTE) standard, a base station may perform pilot and data transmissions using data transmission techniques such as beamforming, using precoding matrices chosen based on an estimate of the channel between the UE and the base station. However, for fast moving UEs, or when the channel is rapidly changing, the actual channel during a transmission may be significantly different from the calculated estimate of the channel. It may be desirable to improve the throughput when transmitting over fast changing channels.

SUMMARY

These and other problems are solved by the disclosed open loop beamforming techniques using cyclic delay diversity schemes with reference signals, such as user equipment reference signal (UE-RS).

In an exemplary aspect of the present disclosure, a wireless communication method, including performing pilot signal transmissions using a precoding matrix for user equipment specific pilot signals, the pilot signal transmissions having a first transmission rank; and performing data transmissions using at least two precoding matrices for data, the data transmissions having a second transmission rank less than or equal to the first transmission rank, in which at least one of the at least two precoding matrices includes a transformed version of the precoding matrix for the user equipment specific pilot signals is disclosed.

In another exemplary aspect of the present disclosure, a wireless communication apparatus, including means for performing pilot signal transmissions using a precoding matrix for user equipment specific pilot signals, the pilot signal transmissions having a first transmission rank; and means for performing data transmissions using at least two precoding matrices for data, the data transmissions having a second transmission rank less than or equal to the first transmission rank, in which at least one of the at least two precoding matrices includes a transformed version of the precoding matrix for the user equipment specific pilot signals is disclosed.

In another exemplary aspect of the present disclosure, a wireless communication apparatus, including a memory for storing instructions to perform pilot signal transmissions using a precoding matrix for user equipment specific pilot signals, the pilot signal transmissions having a first transmission rank; and perform data transmissions using at least two precoding matrices for data, the data transmissions having a second transmission rank less than or equal to the first transmission rank, in which at least one of the at least two precoding matrices includes a transformed version of the precoding matrix for the user equipment specific pilot signals; and a processor for executing the instructions is disclosed.

In another exemplary aspect of the present disclosure, a computer program product comprising a tangible computer readable medium storing instructions, the instructions including code for performing pilot signal transmissions using a precoding matrix for user equipment specific pilot signals, the pilot signal transmissions having a first transmission rank; and code for performing data transmissions using at least two precoding matrices for data, the data transmissions having a second transmission rank less than or equal to the first transmission rank, in which at least one of the at least two precoding matrices includes a transformed version of the precoding matrix for the user equipment specific pilot signals is disclosed.

In another exemplary aspect of the present disclosure, a wireless communication method including performing pilot signal transmissions using a first precoding matrix for user equipment specific pilot signals, the pilot signal transmissions having a first transmission rank; and performing data transmissions using a second precoding matrix for data, the data transmissions having a second transmission rank less than the first transmission rank, in which the second precoding matrix includes a transformed version of the first precoding matrix is disclosed.

In another exemplary aspect of the present disclosure, a wireless communication apparatus including means for performing pilot signal transmissions using a first precoding matrix for user equipment specific pilot signals, the pilot signal transmissions having a first transmission rank; and means for performing data transmissions using a second precoding matrix for data, the data transmissions having a second transmission rank less than the first transmission rank, in which the second precoding matrix includes a transformed version of the first precoding matrix is disclosed.

In another exemplary aspect of the present disclosure, a wireless communication apparatus, including a memory for storing instructions to perform pilot signal transmissions using a first precoding matrix for user equipment specific pilot signals, the pilot signal transmissions having a first transmission rank; and perform data transmissions using a second precoding matrix for data, the data transmissions having a second transmission rank less than the first transmission rank, in which the second precoding matrix includes a transformed version of the first precoding matrix; and a processor for executing the instructions is disclosed.

In another exemplary aspect of the present disclosure, a computer program product comprising a tangible computer readable medium storing instructions, the instructions including code for performing pilot signal transmissions using a first precoding matrix for user equipment specific pilot signals, the pilot signal transmissions having a first transmission rank; and code for performing data transmissions using a second precoding matrix for data, the data transmissions having a second transmission rank less than the first transmission rank, in which the second precoding matrix includes a transformed version of the first precoding matrix is disclosed.

In another exemplary aspect of the present disclosure, a method of selectively providing cyclic delay diversity transmissions using user equipment reference signals, the method including determining an operational state of a channel between a base station and a user equipment; and signaling, based on the determined operational state, a transmission mode to the user equipment wherein at least one transmission scheme includes user equipment specific pilot transmissions using a cyclic delay diversity (CDD) scheme in a resource block using a first precoding matrix and data transmissions in the resource block using one or more of a transformed version of the first precoding matrix is disclosed.

In another exemplary aspect of the present disclosure, an apparatus for selectively providing CDD transmissions using user equipment reference signals (UE-RS), including means for determining an operational state of a channel between a base station and a user equipment (UE); and means for signaling, based on the determined operational state, a transmission mode to the user equipment wherein at least one transmission scheme includes user equipment specific pilot transmissions in a resource block using a first precoding matrix and data transmissions in the resource block using one or more of a transformed version of the first precoding matrix is disclosed.

In another exemplary aspect of the present disclosure, a wireless communication apparatus, including a memory for storing instructions to determine an operational state of a channel between a base station and a user equipment; and signal, based on the determined operational state, a transmission mode to the user equipment wherein at least one transmission scheme includes user equipment specific pilot transmissions in a resource block using a first precoding matrix and data transmissions in the resource block using one or more of a transformed version of the first precoding matrix; and a processor for executing the instructions is disclosed.

In another exemplary aspect of the present disclosure, a computer program product comprising a tangible computer readable medium storing instructions, the instructions including code for determining an operational state of a channel between a base station and a user equipment; and code for signaling, based on the determined operational state, a transmission mode to the user equipment wherein at least one transmission scheme includes user equipment specific pilot transmissions in a resource block using a first precoding matrix and data transmissions in the resource block using one or more of a transformed version of the first precoding matrix.

In another exemplary aspect of the present disclosure, a wireless communication method, including receiving pilot signal transmissions using a first precoding matrix for user equipment specific pilot signals, the pilot signal transmissions having a first transmission rank; and receiving data transmissions using a second precoding matrix for data, the data transmissions having a second transmission rank less than the first transmission rank, in which the second precoding matrix includes a transformed version of the first precoding matrix is disclosed.

In another exemplary aspect of the present disclosure, a wireless communication apparatus, including means for receiving pilot signal transmissions using a first precoding matrix for user equipment specific pilot signals, the pilot signal transmissions having a first transmission rank; and means for receiving data transmissions using a second precoding matrix for data, the data transmissions having a second transmission rank less than the first transmission rank, in which the second precoding matrix includes a transformed version of the first precoding matrix is disclosed.

In another exemplary aspect of the present disclosure, a wireless communication apparatus, including a memory for storing instructions to receive pilot signal transmissions using a first precoding matrix for user equipment specific pilot signals, the pilot signal transmissions having a first transmission rank; and receive data transmissions using a second precoding matrix for data, the data transmissions having a second transmission rank less than the first transmission rank, in which the second precoding matrix includes a transformed version of the first precoding matrix; and a processor for executing the instructions is disclosed.

In another exemplary aspect of the present disclosure, a computer program product comprising a tangible computer readable medium storing instructions, the instructions including code for receiving pilot signal transmissions using a first precoding matrix for user equipment specific pilot signals, the pilot signal transmissions having a first transmission rank; and code for receiving data transmissions using a second precoding matrix for data, the data transmissions having a second transmission rank less than the first transmission rank, in which the second precoding matrix includes a transformed version of the first precoding matrix is disclosed.

In another exemplary aspect of the present disclosure, a wireless communication method, including receiving pilot signal transmissions using a precoding matrix for user equipment specific pilot signals, the pilot signal transmissions having a first transmission rank; and receiving data transmissions using at least two precoding matrices for data, the data transmissions having a second transmission rank equal to the first transmission rank, in which at least one of the at least two precoding matrices includes a transformed version of the precoding matrix for the user equipment specific pilot signals is disclosed.

In another exemplary aspect of the present disclosure, a wireless communication apparatus, including means for receiving pilot signal transmissions using a precoding matrix for user equipment specific pilot signals, the pilot signal transmissions having a first transmission rank; and means for receiving data transmissions using at least two precoding matrices for data, the data transmissions having a second transmission rank equal to the first transmission rank, in which at least one of the at least two precoding matrices includes a transformed version of the precoding matrix for the user equipment specific pilot signals is disclosed.

In another exemplary aspect of the present disclosure, a wireless communication apparatus, including a memory for storing instructions to receive pilot signal transmissions using a precoding matrix for user equipment specific pilot signals, the pilot signal transmissions having a first transmission rank; and receive data transmissions using at least two precoding matrices for data, the data transmissions having a second transmission rank equal to the first transmission rank, in which at least one of the at least two precoding matrices includes a transformed version of the precoding matrix for the user equipment specific pilot signals; and a processor for executing the instructions is disclosed.

In another exemplary aspect of the present disclosure, a computer program product comprising a tangible computer readable medium storing instructions, the instructions including code for receiving pilot signal transmissions using a precoding matrix for user equipment specific pilot signals, the pilot signal transmissions having a first transmission rank; and code for receiving data transmissions using at least two precoding matrices for data, the data transmissions having a second transmission rank equal to the first transmission rank, in which at least one of the at least two precoding matrices includes a transformed version of the precoding matrix for the user equipment specific pilot signals is disclosed.

In another exemplary aspect of the present disclosure, a method of selectively receiving cyclic delay diversity (CDD) transmissions using user equipment reference signals (UE-RS), the method including receiving a transmission mode; and receiving, based on the received transmission mode, pilot transmissions in a resource block using a precoding matrix and data transmissions in the resource block using a transformed version of the precoding matrix is disclosed.

In another exemplary aspect of the present disclosure, a n apparatus for selectively receiving cyclic delay diversity (CDD) transmissions using user equipment reference signals (UE-RS), including means for receiving a transmission mode; and means for receiving, based on the received transmission mode, pilot transmissions in a resource block using a precoding matrix and data transmissions in the resource block using a transformed version of the precoding matrix is disclosed.

In another exemplary aspect of the present disclosure, a wireless communication apparatus, including a memory for storing instructions to receive a transmission mode; and receive, based on the received transmission mode, pilot transmissions in a resource block using a precoding matrix and data transmissions in the resource block using a transformed version of the precoding matrix; and a processor for executing the instructions is disclosed.

In another exemplary aspect of the present disclosure, a computer program product comprising a tangible computer-readable memory comprising instructions for selectively receiving cyclic delay diversity (CDD) transmissions using user equipment reference signals (UE-RS), the instructions including code for receiving a transmission mode; and code for receiving, based on the transmission mode, pilot and data transmissions in a resource block, using a precoding matrix and a transformed version of the precoding matrix, respectively is disclosed.

Various aspects and features of the present disclosure are described in further detail below.

DETAILED DESCRIPTION

Figure 1:
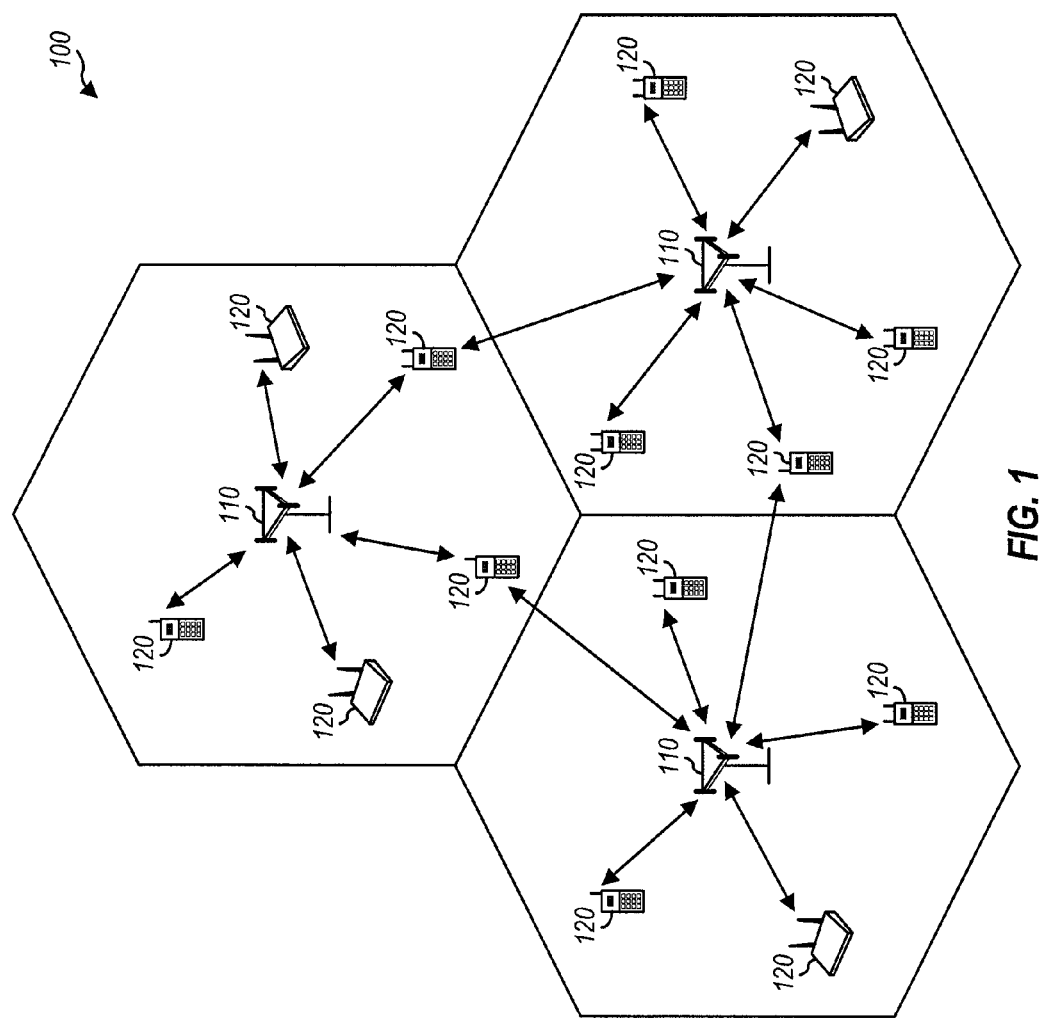
FIG. 1 illustrates a wireless communication system.

As previously discussed, there is a need to provide a mechanism for improving transmission performance under fast varying channel conditions. Such a condition may arise, for example, when a user equipment is moving at a high speed with respect to a base station.

In some designs, cyclic delay diversity (CDD) like schemes with user equipment specific reference signals (UE-RS) are used for open loop beamforming. Pilot and data signals are typically transmitted using the same precoding matrix. However, in CDD schemes, the pilot signals are transmitted using a rank greater than or equal to data transmission and data transmissions are performed by linearly combining one or more vectors of the precoding matrix used for pilots in order to cycle over several precoding matrices and make the channel appear ergodic. These and other aspects are described in greater detail below.

Briefly and in general terms, certain reference signals, such as the UE-RS, may be used by a base station to perform beamforming for transmissions from the base station to the UE since the UE can obtain the precoded channel directly from UE-RS without knowing the precoding matrix. However, when the channel between a base station and the UE is time varying, the beamforming strategy may suffer if the channel condition at the time of performing the beamforming is different from the channel condition at the time of calculating the direction of the beam to be used. Therefore, in certain designs, rather than using a single beam, which may be preferable under certain temporal changes in the channel, multiple beams may be used for data transmissions. The use of multiple beams may result in greater performance close to the average capacity of the channel, as further discussed below.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, or Flash-OFDM®. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. an organization named "3rd Generation Partnership Project" (3GPP) describes UTRA, E-UTRA, UMTS, LTE, LTE-A and GSM in published documents. Another organization named "3rd Generation Partnership Project 2" (3GPP2) describes cdma2000 and UMB in published documents. The techniques described herein may be used for the systems and radio technologies mentioned above as well as other systems and radio technologies. For clarity, certain aspects of the techniques are described below with respect to LTE (and LTE-A), and LTE terminology may be used in much of the description below.

FIG. 1 shows a wireless communication system 100, which may be an LTE system or some other wireless system. System 100 may include a number of evolved Node Bs (eNBs) 110 and other network entities. An eNB may be an entity that communicates with the UEs and may also be referred to as a base station, a Node B, or an access point. Each eNB 110 may provide communication coverage for a particular geographic area and may support communication for the UEs located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB 110 and/or an eNB subsystem serving this coverage area.

UEs 120 may be dispersed throughout the system, and each UE 120 may be stationary or mobile. A UE may also be referred to as a mobile station, a terminal, an access terminal, a subscriber unit, or a station. A UE 120 may be a cellular phone, a personal digital assistant (PDA), a wireless modem, a wireless communication device, a handheld device, a laptop computer, a cordless phone, a wireless local loop (WLL) station, a smart phone, a tablet, a netbook, or a smartbook.

LTE utilizes orthogonal frequency division multiplexing (OFDM) on the downlink and single-carrier frequency division multiplexing (SC-FDM) on the uplink. OFDM and SC-FDM partition a frequency range into multiple ($K_s$) orthogonal subcarriers, which are also commonly referred to as tones, bins. Each subcarrier may be modulated with data. In general, modulation symbols are sent in the frequency domain with OFDM and in the time domain with SC-FDM. The spacing between adjacent subcarriers may be fixed, and the total number of subcarriers ($K_s$) may be dependent on the system bandwidth. For example, $K_s$ may be equal to 128, 256, 512, 1024 or 2048 for system bandwidth of 1.25, 2.5, 5, 10 or 20 mega-Hertz (MHz), respectively. The system bandwidth may correspond to a subset of the $K_s$ total subcarriers.

Figure 2:
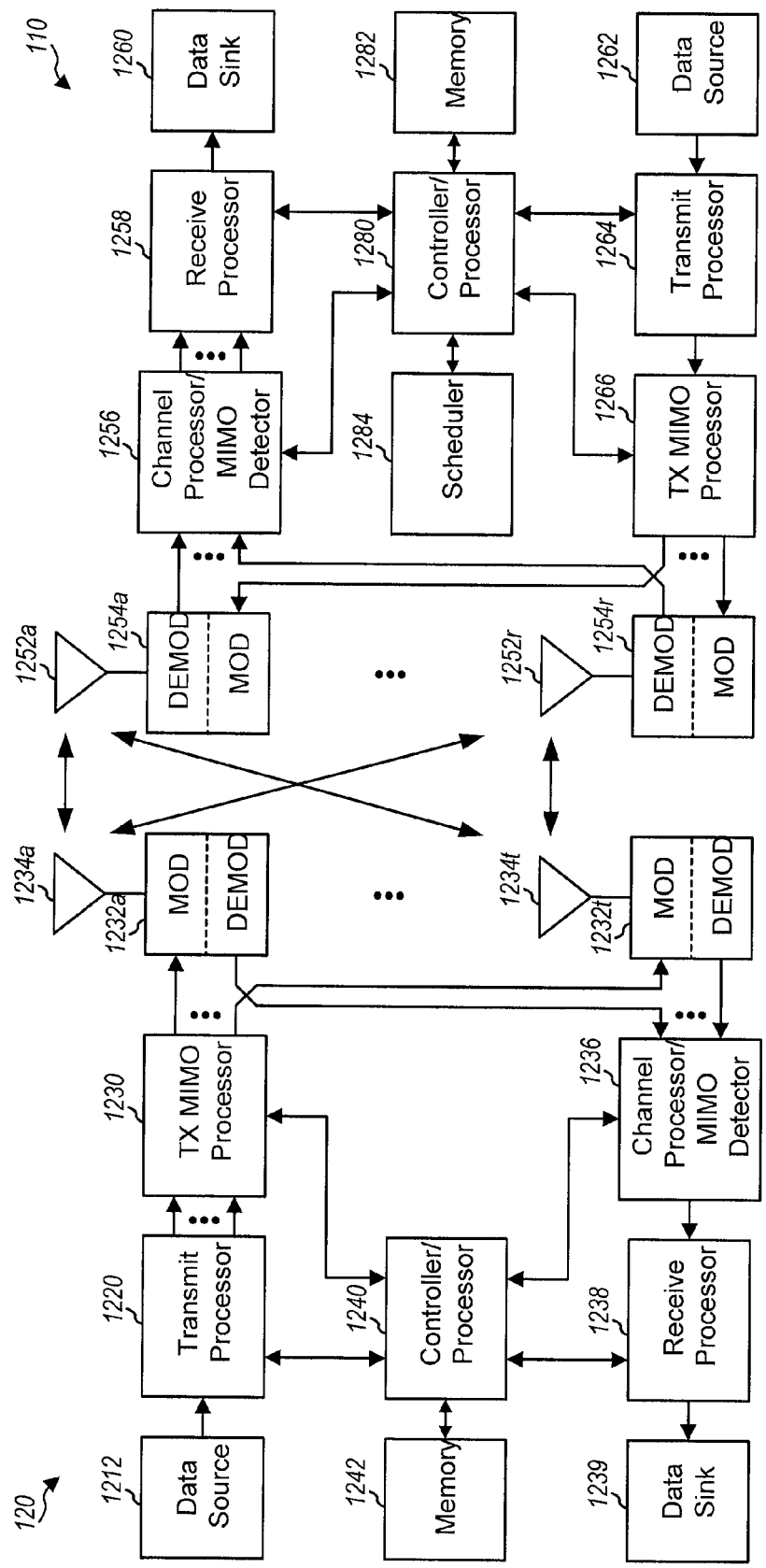
FIG. 2 illustrates an exemplary communication system.

FIG. 2 shows a block diagram of a design of an exemplary base station/eNB 110 and a UE 120, which may be one of the eNBs and one of the UEs in FIG. 1. A UE 120 may be equipped with T antennas 1234a through 1234t, and base station 110 may be equipped with R antennas 1252a through 1252r, where in general T≥1 and R≥1.

At UE 120, a transmit processor 1220 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals for multiple non-contiguous clusters based on one or more RS sequences assigned to UE 120 and may provide reference symbols. A transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232a through 1232t. Each modulator 1232 may process a respective output symbol stream (e.g., for SC-FDMA, OFDM.) to obtain an output sample stream. Each modulator 1232 may further process (e.g., convert to analog, amplify, filter, and upconvert) the output sample stream to obtain an uplink signal. T uplink signals from modulators 1232a through 1232t may be transmitted via T antennas 1234a through 1234t, respectively.

The coded data for each data stream may be multiplexed with pilot data using OFDM techniques. The pilot data can typically be a known data pattern that is processed in a known manner and may be used at the receiver system to estimate the channel response. The multiplexed pilot and coded data for each data stream can then be modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by controller/processor 1240.

At base station 110, antennas 1252a through 1252r may receive the uplink signals from UE 120 and provide received signals to demodulators (DEMODs) 1254a through 1254r, respectively. Each demodulator 1254 may condition (e.g., filter, amplify, downconvert, and digitize) a respective received signal to obtain received samples. Each demodulator 1254 may further process the received samples to obtain received symbols. A channel processor/MIMO detector 1256 may obtain received symbols from all R demodulators 1254a through 1254r. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, at base station 110, data from a data source 1262 and control information from controller/processor 1280 may be processed by a transmit processor 1264, precoded by a TX MIMO processor 1266 if applicable, conditioned by modulators 1254a through 1254r, and transmitted to UE 120. At UE 120, the downlink signals from base station 110 may be received by antennas 1234, conditioned by demodulators 1232, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may perform or direct process 700 in FIG. 7, process 900 in FIG. 9 and/or other processes for the techniques described herein. Processor 1256, processor 1280, and/or other processors and modules at base station 110 may perform or direct process 300 in FIG. 3, process 500 in FIG. 5 and/or other processes for the techniques described herein. Memories 1242 and 1282 may store data and program codes for UE 120 and base station 110, respectively. A scheduler 1284 may schedule UEs for downlink and/or uplink transmission and may provide allocations of resources (e.g., assignment of multiple non-contiguous clusters, RS sequences for demodulation reference signals.) for the scheduled UEs.

As stated above, there exits a need to improve performance under fast time varying channel scenarios. The terms "fast" or "high speed" do not necessarily imply an absolute value, but are used to denote a relative rate of change in channel condition in relation to the time period between when a channel is estimated and when a transmission is performed using a precoding matrix selected based on the channel estimate. For example, in some designs, a channel that changed from one subframe period to the next may be considered "fast time varying."

In the advanced Long Term Evolution standard for wireless communication (LTE-A), two new types of reference signals were defined. That is, a channel state information-reference signal (CSI-RS) which is used for channel estimation for feedback purposes and UE-RS which are precoded pilots sent along with data on the data Resource Blocks (RBs). The precoding used for the pilots is the same as data.

For low speed UEs 120, the precoders may be selected based on feedback from the UE 120 and may be used before the channel has changed significantly. For high speed UEs 120, open loop schemes such as precoder cycling can be employed where several different (randomly selected) precoders are used for the data allocated to the UE 120. As discussed above, by "sweeping" the channel in different directions this may make the channel appear ergodic.

In some designs, a UE-RS based transmission scheme (for both closed loop and open loop beamforming) may involve using the same precoder for both data and pilots within an RB (or within a set of contiguous RBs if bundling is used). In some designs, CDD may be used for data to achieve further randomization of the precoding vectors. For example, in certain designs, in each RB (or each set of bundled RBs if PRB bundling is used), a precoding matrix may be chosen to precode the pilots with.

The chosen precoding matrix P may be of dimension N×r1, where N is the number of transmit antennas and r1 is the pilot transmission rank. Rank r1 may be larger than or equal to r, which is a current transmission rank for data. The pilot transmissions within a set of bundled RBs may be sent using precoding corresponding to columns of the precoding matrix P. It may be noted that because the pilots are precoded, the UE 120 does not need to know the precoding matrix used. However, the UE 120 may need to know the bundling size (number of RBs over which the same precoder is used). Also, the UE 120 may need to know r1 and r. Accordingly, the eNB 110 may transmit the transmission ranks r1 and r, used for pilot and data transmissions, to the UE 120. The UE 120 may also need to know the transformations that map the precoding matrix P to precoding matrices used for data.

For a data tone, denoted as a function of indices (f,t), where indices f and t denoting the frequency location and time location respectively, the precoding used may be represented as P U(f,t). In this representation, U(f,t) may be a matrix of dimension r1×r. In certain designs, the U matrix may be chosen to utilize full transmission power. In certain designs, U matrix may be chosen such that:

$$U(f,t)^* U(f,t) = I, \text{ the identity matrix} \quad \text{Eq. (1)}$$

The operation * represents a transpose conjugate (Hermitian adjoint) of a matrix. In some designs, where r1=r, the U matrix may be a square unitary matrix (with real or complex entries).

It may be noted that the transformation matrix U is a function of variables f and t, implying that a possibly different matrix may be chosen for each data location. In certain designs, the functional dependence of the entries of the U matrix on the variables f and t may be chosen a priori and may be known at both the UE 120 and the eNB 110.

In certain designs, when r1=r, one choice of U(f,t) may be:

$$U(f,t) = D(f) U_R \quad \text{Eq. (2)}$$

In Eq. (2), D(f) is a diagonal matrix with elements as shown in Table 1 below. In Eq. (2), $U_R$ is a fixed unitary matrix depending on the transmission rank r. It is understood that Table 1 below illustrates one example of generating a transformation matrix U and that other examples may be implemented as well.

TABLE 1

| Number of layers r | $U_R$ | D(f) |
|---|---|---|
| 2 | $\frac{1}{\sqrt{2}} \begin{bmatrix} 1 & 1 \\ 1 & e^{-j2\pi/2} \end{bmatrix}$ | $\begin{bmatrix} 1 & 0 \\ 0 & e^{-j2\pi f/2} \end{bmatrix}$ |
| 3 | $\frac{1}{\sqrt{3}} \begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi f/3} & 0 \\ 0 & 0 & e^{-j4\pi f/3} \end{bmatrix}$ |
| 4 | $\frac{1}{2} \begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi f/4} & 0 & 0 \\ 0 & 0 & e^{-j4\pi f/4} & 0 \\ 0 & 0 & 0 & e^{-j6\pi f/4} \end{bmatrix}$ |

Figure 3:
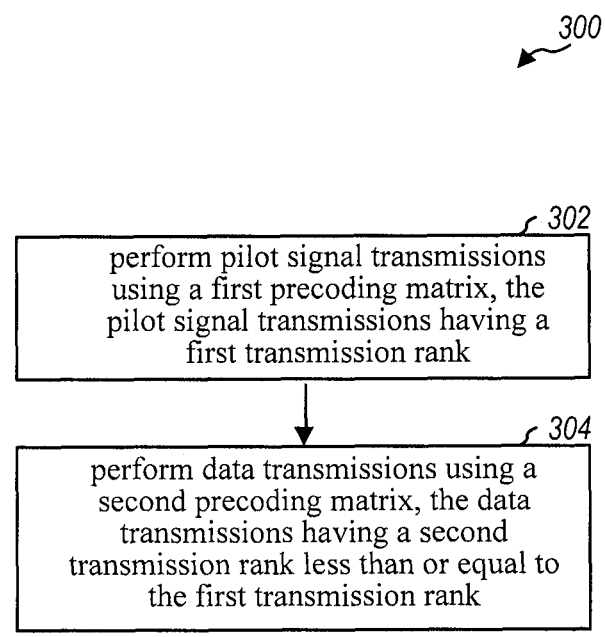
FIG. 3 is a flow chart illustrating a base station process of wireless communication.

FIG. 3 shows a flow chart of a process 300 for wireless communication implemented, for example, at the eNB 110. At block 302, pilot signal transmissions are performed using a first precoding matrix (e.g., the matrix P), the pilot signal transmissions having a first transmission rank (e.g., r1). At block 304, data transmissions are performed using a second precoding matrix (e.g., PU(f,t)), the data transmissions having a second transmission rank (r), less than or equal to the first transmission rank is disclosed. The second precoding matrix includes a matrix transformation of the first precoding matrix. Alternatively, data transmissions can be performed using at least two precoding matrices when the second transmission rank is less than or equal to the first transmission rank. Accordingly, the precoding matrix used for data is a matrix transformation of the precoding matrix used for user equipment specific pilot signals. In some embodiments, the process 300 and the above-described elements may be varied and are not limited to the functions, implementations or examples provided.

Figure 4:
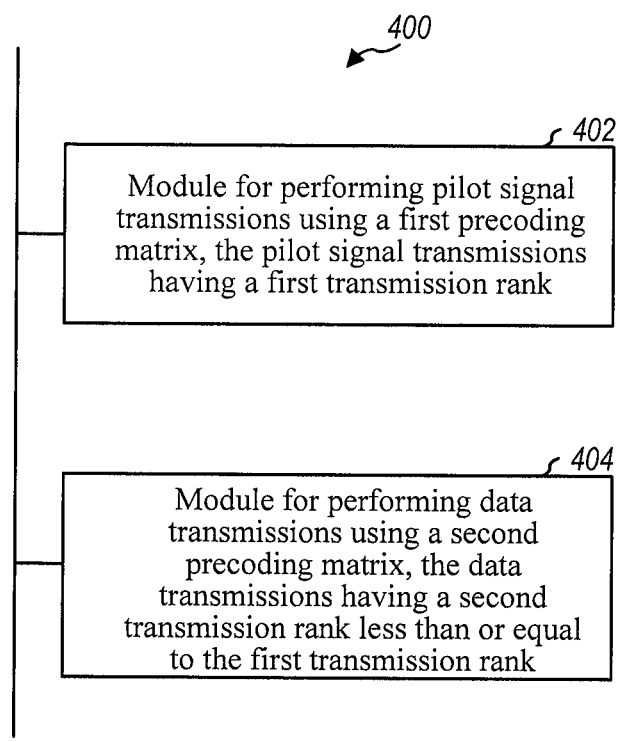
FIG. 4 is a block diagram representation of a wireless communication transmitter apparatus.

FIG. 4 is a block diagram representation of an apparatus 400 for wireless communication. The apparatus 400 includes module 402 for performing pilot signal transmissions in using a first precoding matrix, the pilot signal transmissions having a first transmission rank and module 404 for performing data transmissions using a second precoding matrix, the data transmissions having a second transmission rank less than or equal to the first transmission rank. The second precoding matrix includes a matrix transformation of the first precoding matrix. Alternatively, data transmissions can be performed using at least two precoding matrices when the second transmission rank is less than or equal to the first transmission rank. Accordingly, the precoding matrix used for data is a matrix transformation of the precoding matrix used for user equipment specific pilot signals. The apparatus 400 may implement the various techniques disclosed herein. In some embodiments, the apparatus 400 and the above-described elements may be varied and are not limited to the functions, structures, configurations, implementations or examples provided.

Figure 5:
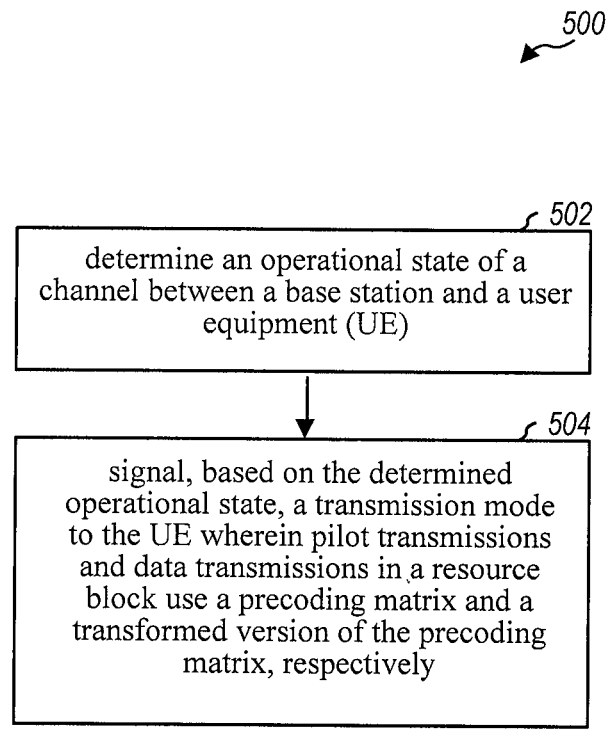
FIG. 5 is a flow chart illustrating a base station process of wireless communication.

FIG. 5 shows a flow chart representation of a process 500 of selectively providing cyclic delay diversity (CDD) transmissions using user equipment reference signals (UE-RS) is disclosed. At block 502, an operational state of a channel between a base station and a user equipment (UE) is determined. At block 504, a transmission mode is signaled to the (UE) wherein pilot transmissions in a resource block use a precoding matrix and data transmissions in the resource block use one or more of a transformed version of the precoding matrix. The transmission mode signaled may, for example, indicate whether the eNB 110 will use the CDD UE-RS-based scheme described above, or will transmit without using CDD. In some embodiments, the process 500 and the above-described elements may be varied and are not limited to the functions, implementations or examples provided.

Figure 6:
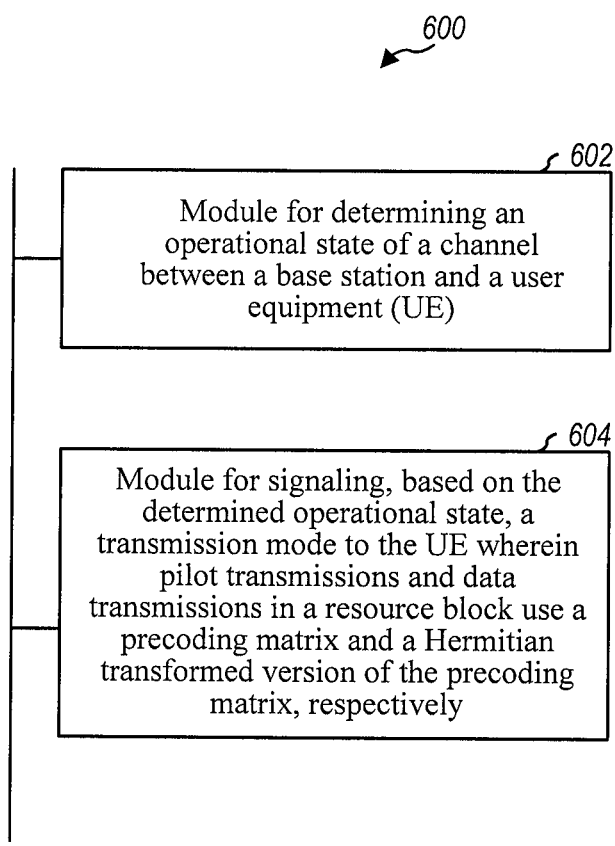
FIG. 6 is a block diagram representation of a wireless communication transmitter apparatus.

FIG. 6 shows a block diagram representation of an apparatus 600 selectively providing cyclic delay diversity (CDD) transmissions using user equipment reference signals (UE-RS). The apparatus 600 includes a module 602 for determining an operational state of a channel between a base station and a user equipment (UE) and module 604 for signaling, based on the determined operational state, a transmission mode to the (UE) wherein pilot transmissions in a resource block use a precoding matrix and data transmissions in the resource block use one or more of a transformed version of the precoding matrix. In some embodiments, the apparatus 600 and the above-described elements may be varied and are not limited to the functions, structures, configurations, implementations or examples provided.

Figure 7:
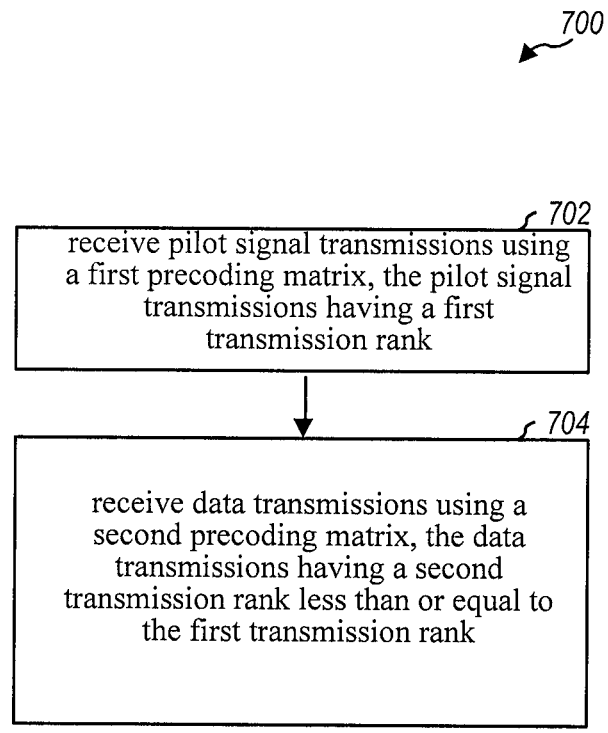
FIG. 7 is a flow chart illustrating a user equipment process of wireless communication.

FIG. 7 shows a flow chart of a process 700 for wireless communication. At block 702, pilot signal transmissions are received using a first precoding matrix, the pilot signal transmissions having a first transmission rank. At block 704, data transmissions are received using a second precoding matrix, the data transmissions having a second transmission rank less than or equal to the first transmission rank. The second precoding matrix includes a transformed version of the first precoding matrix. Alternatively, data transmissions can be received using at least two precoding matrices when the second transmission rank is equal to the first transmission rank. Accordingly, the precoding matrix used for data is a matrix transformation of the precoding matrix used for user equipment specific pilot signals. In some embodiments, the process 700 and the above-described elements may be varied and are not limited to the functions, implementations or examples provided.

Figure 8:
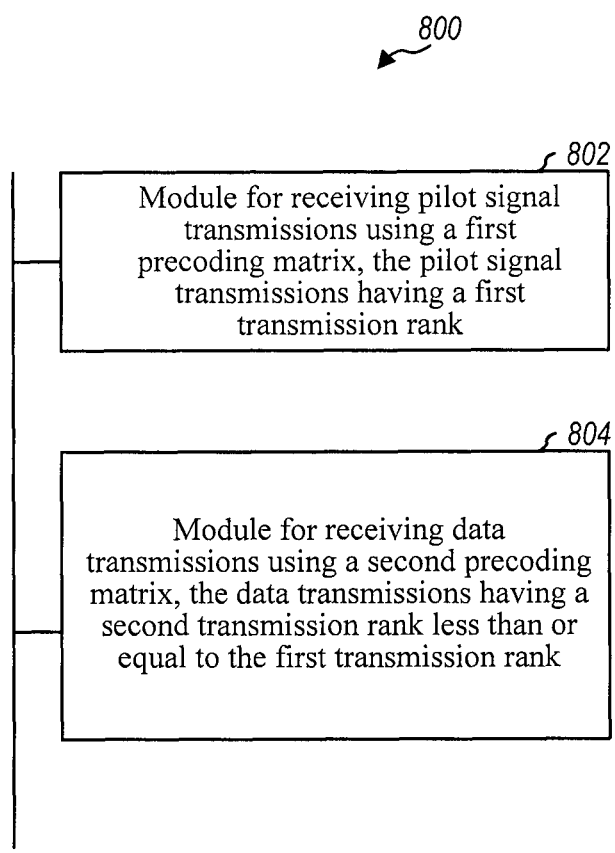
FIG. 8 is a block diagram representation of a wireless communication receiver apparatus.

FIG. 8 is a block diagram representation of a wireless communication apparatus 800. A module 802 is provided for receiving pilot signal transmissions using a first precoding matrix, the pilot signal transmissions having a first transmission rank. A module 804 is provided for receiving data transmissions using a second precoding matrix, the data transmissions having a second transmission rank less than or equal to the first transmission rank. The second precoding matrix includes a transformed version of the first precoding matrix. Alternatively, the module 804 can receive data transmissions using at least two precoding matrices when the second transmission rank is equal to the first transmission rank. Accordingly, the precoding matrix used for data is a matrix transformation of the precoding matrix used for user equipment specific pilot signals. In some embodiments, the apparatus 800 and the above-described elements may be varied and are not limited to the functions, structures, configurations, implementations or examples provided.

Figure 9:
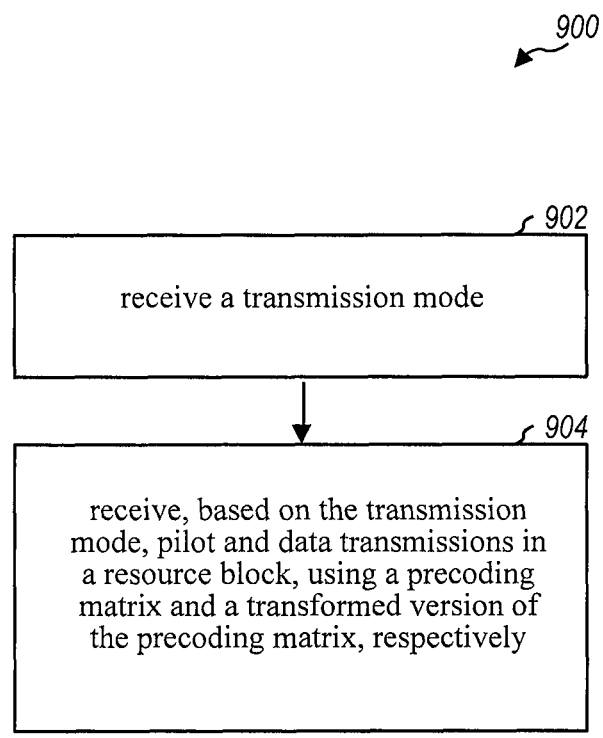
FIG. 9 is a flow chart illustrating a user equipment process of wireless communication.

FIG. 9 is a flow chart representation of a process 900 for wireless communication of selectively receiving cyclic delay diversity (CDD) transmissions using user equipment specific reference signals (UE-RS). At block 902, a transmission mode is received. In an aspect, the transmission mode may include one or more transmission schemes. The one or more transmission schemes may include the CDD scheme. At block 904, based on the transmission mode, pilot and data transmissions are received in a resource block using a precoding matrix and a transformed version of the precoding matrix, respectively. The precoding matrix may include the matrix P, and the transformed version may include the matrix PU(f,t), as was discussed above.

Figure 10:
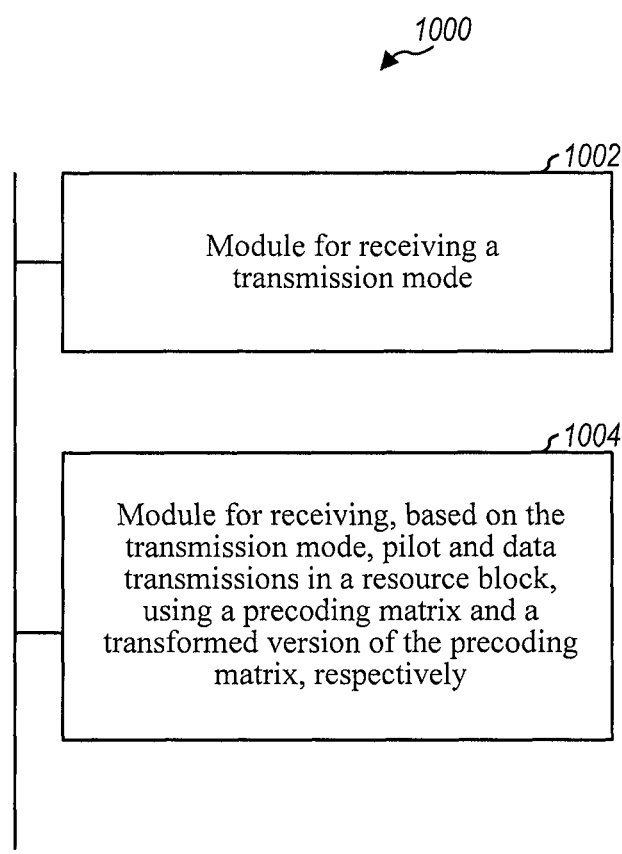
FIG. 10 is a block diagram representation of a wireless communication receiver apparatus.

FIG. 10 is a block diagram representation of an apparatus 1000 for selectively receiving CDD transmissions using UE-RS is disclosed. The apparatus 1000 includes module 1002 for receiving a transmission mode and module 1004 for receiving, based on the transmission mode, pilot and data transmissions in a resource block using a precoding matrix and a transformed version of the precoding matrix, respectively. In some embodiments, the apparatus 1000 and the above-described elements may be varied and are not limited to the functions, structures, configurations, implementations or examples provided.

It will be appreciated that the present disclosure provides techniques for transmitting data by using multiple beam formations from the eNB 110 to the UE 120. The multiple beam formations may be achieved by using a precoding matrix for data transmission, which is a transformed version of a precoding matrix used for pilot transmissions in the same RB. The transformation may be performed by multiplying with a matrix.

It will further be appreciated that pilots may be transmitted using a transmission rank higher than the transmission rank used for data transmission. The rank calculation may be performed using channel quality results obtained from channel state information reference signal (CSI-RS) transmissions or based on uplink measurements.

It will further be appreciated that techniques for using cyclic delay diversity with UE-RS are disclosed, wherein the same precoder matrix (or a linear combination of vectors thereof) are used for precoding transmissions. Furthermore, by using matrices that satisfy Eq. (1) to combine the vectors of the precoder matrix, possible loss of transmission power level in data transmissions can be mitigated.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of selectively providing cyclic delay diversity transmissions using user equipment reference signals, the method comprising:
   determining an operational state of a channel between a base station and a user equipment; and
   signaling, based on the determined operational state, a transmission mode to the user equipment, wherein the transmission mode includes at least one transmission scheme including:
      performing user equipment specific pilot transmissions in a resource block using a first precoding matrix; and
      performing data transmissions in the resource block using one or more of a transformed version of the first precoding matrix used for the user equipment specific pilot transmissions, wherein the one or more of a transformed version of the first precoding matrix is obtained by:
         determining a transformation matrix, wherein values of the transformation matrix are dependent on at least one of frequency and time; and
         applying the transformation matrix to the first precoding matrix to obtain the one or more of a transformed version of the first precoding matrix.

2. The method of claim 1, wherein the determining the operational state includes determining a Doppler speed of the user equipment.

3. The method of claim 1, wherein the user equipment specific pilot transmissions have a first transmission rank and the data transmissions have a second transmission rank.

4. The method of claim 3, wherein the data transmissions use at least two precoding matrices when the second transmission rank is equal to the first transmission rank.

5. The method of claim 1, wherein the user equipment specific pilot transmissions use a first precoding matrix for user equipment specific pilot signals.

6. The method of claim 3, further including determining the first transmission rank and the second transmission rank based on user equipment feedback or uplink measurements.

7. The method of claim 3, further including providing the first transmission rank and the second transmission rank to the user equipment.

8. An apparatus for selectively providing cyclic delay diversity (CDD) transmissions using user equipment reference signals (UE-RS), comprising:
   means for determining an operational state of a channel between a base station and a user equipment (UE); and
   means for signaling, based on the determined operational state, a transmission mode to the user equipment, wherein the transmission mode includes at least one transmission scheme including:
      performing user equipment specific pilot transmissions in a resource block using a first precoding matrix; and
      performing data transmissions in the resource block using one or more of a transformed version of the first precoding matrix used for the user equipment specific pilot transmissions, wherein the one or more of a transformed version of the first precoding matrix is obtained using:
         means for determining a transformation matrix, wherein values of the transformation matrix are dependent on at least one of frequency and time; and
         means for applying the transformation matrix to the first precoding matrix to obtain the one or more of a transformed version of the first precoding matrix.

9. The apparatus of claim 8, wherein the means for determining the operational state includes means for determining a Doppler speed of the user equipment.

10. The apparatus of claim 8, wherein the user equipment specific pilot transmissions have a first transmission rank and the data transmissions have a second transmission rank.

11. The apparatus of claim 10, wherein the data transmissions use at least two precoding matrices when the second transmission rank is equal to the first transmission rank.

12. The apparatus of claim 8, wherein the user equipment specific pilot transmissions use a first precoding matrix for user equipment specific pilot signals.

13. The apparatus of claim 10, further including means for determining the first transmission rank and the second transmission rank based on user equipment feedback or uplink measurements.

14. The apparatus of claim 10, further including means for providing the first transmission rank and the second transmission rank to the user equipment.

15. A wireless communication apparatus, comprising:
a memory for storing instructions to:
determine an operational state of a channel between a base station and a user equipment; and
signal, based on the determined operational state, a transmission mode to the user equipment, wherein the transmission mode includes at least one transmission scheme including:
performing user equipment specific pilot transmissions in a resource block using a first precoding matrix; and
performing data transmissions in the resource block using one or more of a transformed version of the first precoding matrix used for the user equipment specific pilot transmissions, wherein the one or more of a transformed version of the first precoding matrix is obtained using instructions to:
determine a transformation matrix, wherein values of the transformation matrix are dependent on at least one of frequency and time; and
apply the transformation matrix to the first precoding matrix to obtain the one or more of a transformed version of the first precoding matrix; and
a processor for executing the instructions.

16. The apparatus of claim 15, wherein the instructions to determine the operational state include instructions to determine a Doppler speed of the user equipment.

17. The apparatus of claim 15, wherein the user equipment specific pilot transmissions have a first transmission rank and the data transmissions have a second transmission rank.

18. The apparatus of claim 17, wherein the data transmissions use at least two precoding matrices when the second transmission rank is equal to the first transmission rank.

19. The apparatus of claim 15, wherein the user equipment specific pilot transmissions use a first precoding matrix for user equipment specific pilot signals.

20. The apparatus of claim 17, further including instructions to determine the first transmission rank and the second transmission rank based on user equipment feedback or uplink measurements.

21. The apparatus of claim 17, further including instructions to provide the first transmission rank and the second transmission rank to the user equipment.

22. A non-transitory tangible computer readable medium storing instructions, the instructions comprising:
code for determining an operational state of a channel between a base station and a user equipment; and
code for signaling, based on the determined operational state, a transmission mode to the user equipment, wherein the transmission mode includes at least one transmission scheme including:
performing user equipment specific pilot transmissions in a resource block using a first precoding matrix; and
performing data transmissions in the resource block using one or more of a transformed version of the first precoding matrix used for the user equipment specific pilot transmissions, wherein the one or more of a transformed version of the first precoding matrix is obtained using:
code for determining a transformation matrix, wherein values of the transformation matrix are dependent on at least one of frequency and time; and
code for applying the transformation matrix to the first precoding matrix to obtain the one or more of a transformed version of the first precoding matrix.

23. The non-transitory tangible computer readable medium of claim 22, wherein the code for determining the operational state includes code for determining a Doppler speed of the user equipment.

24. The non-transitory tangible computer readable medium of claim 22, wherein the user equipment specific pilot transmissions have a first transmission rank and the data transmissions have a second transmission rank.

25. The non-transitory tangible computer readable medium of claim 24, wherein the data transmissions use at least two precoding matrices when the second transmission rank is equal to the first transmission rank.

26. The non-transitory tangible computer readable medium of claim 22, wherein the user equipment specific pilot transmissions use a first precoding matrix for user equipment specific pilot signals.

27. The non-transitory tangible computer readable medium of claim 24, wherein the instructions further include code for determining the first transmission rank and the second transmission rank based on user equipment feedback or uplink measurements.

28. The non-transitory tangible computer readable medium of claim 24, wherein the instructions further include code for providing the first transmission rank and the second transmission rank to the user equipment.

* * * * *